US008746073B2

(12) United States Patent
Getman et al.

(10) Patent No.: US 8,746,073 B2
(45) Date of Patent: Jun. 10, 2014

(54) METHOD FOR PRESSURE MEASUREMENT IN THE CASE OF VARIABLE TEMPERATURES AND PRESSURE MEASURING SENSOR FOR PRESSURE MEASUREMENT IN THE CASE OF VARIABLE TEMPERATURES

(75) Inventors: Igor Getman, Lorrach (DE); Manuel Bondi-Liedtke, Todtnau (DE); Thomas Uehlin, Schopfheim (DE); Elmar Wosnitza, Freiburg (DE)

(73) Assignee: Endress + GmbH + Co. KG, Maulburg (DE)

( * ) Notice: Subject to any disclaimer, the term of this patent is extended or adjusted under 35 U.S.C. 154(b) by 317 days.

(21) Appl. No.: 13/386,193

(22) PCT Filed: Jun. 22, 2010

(86) PCT No.: PCT/EP2010/058785

§ 371 (c)(1),
(2), (4) Date: Jan. 20, 2012

(87) PCT Pub. No.: WO2011/009682

PCT Pub. Date: Jan. 27, 2011

(65) Prior Publication Data

US 2012/0118065 A1  May 17, 2012

(30) Foreign Application Priority Data

Jul. 21, 2009 (DE) .......................... 10 2009 027 899

(51) Int. Cl.
*G01L 19/04* (2006.01)

(52) U.S. Cl.
USPC ........................................................... 73/708

(58) Field of Classification Search
None
See application file for complete search history.

(56) References Cited

U.S. PATENT DOCUMENTS

| 5,394,345 A | 2/1995 | Berard et al. |
| 2002/0120411 A1* | 8/2002 | Fierro et al. .................. 702/51 |
| 2004/0221655 A1 | 11/2004 | Chen et al. |
| 2005/0000290 A1 | 1/2005 | Petit et al. |
| 2010/0139407 A1 | 6/2010 | Dannhauer et al. |

FOREIGN PATENT DOCUMENTS

| DE | 4315336 A1 | 11/1994 |
| DE | 102006050451 A1 | 4/2008 |
| WO | 2011/009682 A1 | 1/2011 |

OTHER PUBLICATIONS

International Preliminary Examination Report in corresponding International Application No. PCT/EP2010/058785, dated Feb. 16, 2012.
German Search Report in corresponding International Application No. PCT/EP2010/058785, dated Sep. 9, 2010.

* cited by examiner

*Primary Examiner* — Andre Allen
(74) *Attorney, Agent, or Firm* — Bacon & Thomas, PLLC

(57) ABSTRACT

A method for the compensating temperature gradient influences on a pressure measuring transducer, comprising the steps of: registering a pressure signal $S_p(t)$; registering a temperature signal $T(t)$; ascertaining a pressure measured value $p_s(S_p(t), T(t))$; determining the time derivative of the temperature signal $dT/dt$; correcting the pressure measured value with a correction function, which depends on the time derivative, wherein, as a function of the sign of the time derivative, another correction function is selected, or other coefficients in a function of equal type are selected.

15 Claims, 3 Drawing Sheets

METHOD FOR PRESSURE MEASUREMENT IN THE CASE OF VARIABLE TEMPERATURES AND PRESSURE MEASURING SENSOR FOR PRESSURE MEASUREMENT IN THE CASE OF VARIABLE TEMPERATURES

TECHNICAL FIELD

The present invention relates to a method for pressure measurement in the case of variable temperatures and a pressure measuring sensor for such purpose.

BACKGROUND DISCUSSION

It is known, that pressure measuring sensor have a cross-sensitivity to temperature, so that it is usual to correct the influence of temperature on the pressure measurement. In the case of the established correction methods, however, an equilibrium state is assumed, which is not suitable for taking into consideration in appropriate manner the influences of time varying temperature gradients. Petit et al. disclose in US 2005l0000290 A1 a method, in which the first derivative of the temperature with respect to time and the second derivative of the temperature with respect to time are used, in order to compensate the influence of temperature gradients. Dannhauer et al. disclose in DE 10 2006 050 451 A1 a pressure measuring device, which, based on the characteristic step response to a temperature jump, uses the corresponding time-dependent integral temperature of the pressure measuring cell, in order to compensate the temperature influence on the pressure measurement value.

The approach of taking the rate of a temperature change, or the time derivative of a temperature into consideration for the compensating is correct in theory, for the rate of a temperature change is a measure for the temperature gradients, whose influence on the pressure measurement value, as a result, can no longer be compensated with a equilibrium model. However, the work of Petit et al. is deficient to the extent that it describes the pressure measuring sensor in some ways as a Markov system, which is completely determined by the current parameters. This assumption can be appropriate perhaps for particular systems, but it has, however, certainly no general validity, for in a real-life pressure measuring device, in which different materials are interacting mechanically with one another at interfaces, the behavior of the system can be co-determined by its previous history, especially in the case where the materials, at least partially, are not only elastic, but, instead, also have plastic properties.

SUMMARY OF THE INVENTION

It is, therefore, an object of the present invention to provide an improved method for the compensating of temperature gradient influences on a pressure measuring sensor. It is also an object of the present invention to provide a pressure measuring sensor, which implements such a method.

The method of the invention for compensating temperature gradient influences on a pressure measuring sensor includes the steps as follows:
registering a temperature signal T(t), determining the time derivative of the temperature signal dT/dt; correcting a pressure measured value with a correction function, which depends on the time derivative; wherein, as a function of the sign of the time derivative, another correction function is selected, or other coefficients in a function of equal type are selected.

In a further development of the invention, a correction function $P_{corr}$ (T, $T_0$, dT/dt), which is applied in the case of one sign of dT/dt, has a greater effect on the pressure measurement value than a correction function, which is applied in the case of the other sign of dT/dt, especially it holds that $$|P_{corr}(T,T_0,dT/dt)/(dT/dt)| \text{ for } dT/dt<0$$

is smaller than $$|P_{corr}(T,T_0,dT/dt)/(dT/dt)| \text{ for } dT/dt>0.$$

In a further development of the invention, the correction function is proportional to the time derivative of the temperature dT/dt, wherein the correction function, for example, is only applied when the magnitude of dT/dt exceeds a reference value $R_{krit}$. Beneath this limit value, a correction for dynamic temperature effects can be omitted.

In another further development of the invention, the correction function is proportional to a sum, which contains a constant and a product of a coefficient and the difference between the current temperature and a start temperature $T_0$. The start temperature $T_0$ is especially that temperature, which is measured, when in a correction cycle, for the first time, the magnitude of the derivative of the temperature with respect to time exceeds the reference value $R_{krit}$.

The pressure measuring arrangement of the invention includes: A housing; a pressure measuring cell, which is arranged in the housing; and a temperature sensor, which is arranged in the housing, wherein the pressure measuring cell is contactable with a media pressure through a housing opening, wherein the pressure measuring cell has a transducer, which outputs a pressure dependent, primary signal, wherein the temperature sensor registers a temperature relevant for the behavior of the pressure measuring cell, and outputs a temperature signal, which corresponds to such temperature, wherein the pressure measuring sensor further contains a processing circuit, in order to provide a pressure measurement value, which depends on the primary signal, the temperature signal and the time derivative of the temperature signal, wherein the extent of the influence of the time derivative on the pressure measurement value depends on the sign of the time derivative.

In a further development of the invention, the pressure measuring sensor includes a pressure measuring cell, which is contactable directly with the medium through the housing opening, wherein a sealing ring axially is clamped between a housing wall surrounding the housing opening and an end face of the pressure measuring cell.

In a further development of the invention, the sealing ring comprises an elastomer.

In an embodiment of this further development of the invention, the sealing ring is radially supported by a section of the housing wall.

In a further development of the invention, the pressure measuring cell comprises a ceramic, pressure measuring cell, especially a measuring cell with a measuring membrane of corundum and a platform of corundum. In an embodiment of this further development of the invention, the measuring membrane and the platform are joined with an active braze.

The housing of the pressure measuring sensor of the invention comprises a metal material, especially steel, in a currently preferred embodiment of the invention.

In a further development, the temperature sensor referenced for compensating the dynamic temperature influences is in thermal contact with the pressure measuring cell. Especially, the temperature sensor can be arranged on a rear surface of the platform of the pressure measuring cell.

In a further development of the invention, the pressure measurement value output by the pressure measuring sensor is ascertained in a two-stage method, wherein, first, a pressure measurement value is obtained taking into consideration the primary signal and the temperature signal, and wherein the following compensation for dynamic temperature fluctuations occurs when the magnitude of the time derivative of the temperature dT/dt exceeds a reference value $R_{krit}$.

BRIEF DESCRIPTION OF THE DRAWINGS

The invention will now be explained based on an example of an embodiment illustrated in the drawing, the figures of which show as follows.

DETAILED DISCUSSION IN CONJUNCTION WITH THE DRAWINGS

Figure 1:
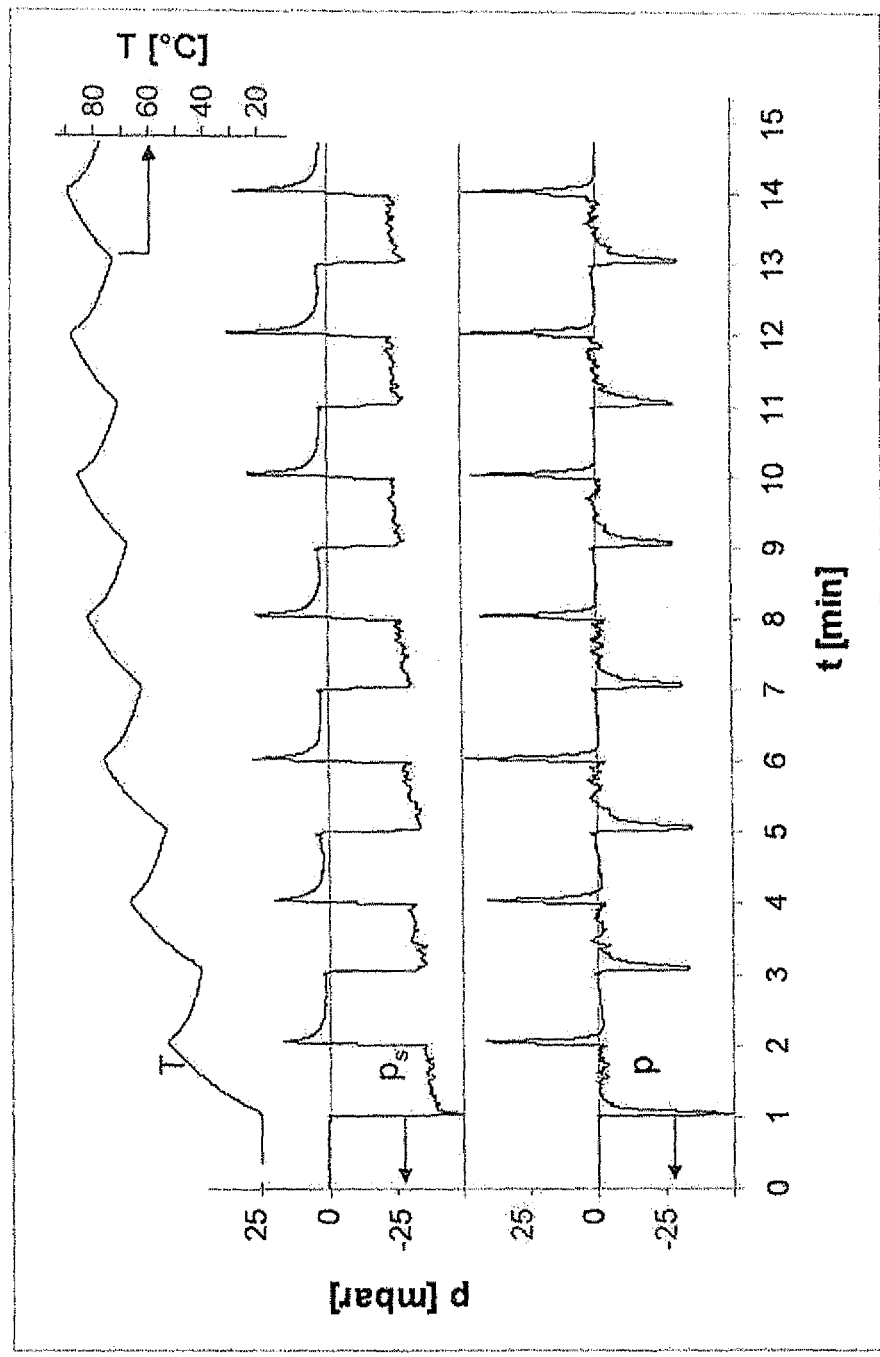
FIG. 1 shows measurement data of cyclically occurring temperature jumps.

The measurement data illustrated in FIG. 1 show zero point fluctuations of a pressure measuring sensor, which was subjected by media change alternately to temperature jumps between 4 degree Celsius and 150 degree Celsius. In such case, the curve marked with T shows the temperature signal, which was registered by a temperature sensor of the pressure measuring sensor of the invention, and which can follow the temperature jumps only with a characteristic time constant. The curve marked with $p_s$ shows a pressure measurement value, which was ascertained based on a primary signal of the transducer of a pressure measuring cell of a pressure measuring sensor of the invention and based on the temperature signal of the temperature sensor associated with the pressure measuring sensor. It is clear that the zero-point of the pressure signal is shifted in the case of positive temperature jumps strongly toward negative values, and that the zero-point in the case of negative temperature jumps is shifted into the positive region. In this picture, it is evident that the pressure zero point relaxes, thus approaches the true value, clearly faster in the case of negative temperature jumps than in the case of positive temperature jumps. The cause of this different behavior is explored further below.

The curve marked with p shows the curve of the zero point signal after application of the method of the invention on the data illustrated in the curve $p_s$. In such case, it is clear that the corrected pressure signal already after a short overshooting comes very rapidly back into a tolerance band about the zero-point, and, indeed, independently of whether it was a positive temperature jump or a negative temperature jump.

For the data in FIG. 1, the pressure measurement value $p(S_p, T)$ to be output is ascertained according to following equation:

$$p(S_p, T) := p_s(S_p, T) - p_{corr}\left(T, T_0, \frac{dT}{dt}\right)$$

In such case, $p_{corr}$ the correction term that is applied, when the magnitude of the time derivative of the temperature exceeds a critical reference value. $p_{corr}$ satisfies, in such case, generally the following formula:

$$p_{corr}\left(T, T_0, \frac{dT}{dt}\right) := \frac{dT}{dt} \cdot [a + b \cdot (T - T_0)]$$

The start temperature $T_0$ is the temperature, which is measured, when in measurement operation, for the first time, $|dT/dt| > R_{krit}$, or, when after operating conditions with slow temperature changes, thus $|dT/dt| < R_{krit}$, for the first time, again $|dT/dt| > R_{krit}$.

In the case of sign change of temperature jumps, there is, indeed, in the case of analytical representation, absolutely a zero location for dT/dt, which, of course, implies that there is a point with $|dT/dt| < R_{krit}$ between the two temperature jumps. However, in the case of a numerical implementation with corresponding average formation, this zero location can be skipped over. Thus, in the case of numerical evaluation of the raw data, an alternative criterion for setting a new value for $T_0$ can be the occurrence of a sign change of dT/dt coupled with continued fulfillment of the criterion $|dT/dt| > R_{krit}$. The correction with $p_{corr}$ performed until the derivative of temperature with respect to time has a magnitude, which is smaller than a termination criterion, wherein the reference value can be, for example, again $R_{krit}$.

According to the above considerations and the present data, the coefficients a and b for positive temperature jumps and negative temperature jumps can, or, in given cases, must, be different, wherein the concrete values for each pressure transducer type is to be individually determined. In such case, it has been found that the coefficient b for positive temperature jumps has a dependence on the respective start temperature of a temperature jump, and, for example, can be described by a polynomial, especially a polynomial of second or third order in $T_0$.

Coefficients for dT/dt>0 are:

$a := a_+$ $b(T_0) := \Sigma b_i \cdot T_0^i$, i=0, 1, ..., N (especially N=2 or 3)

For negative temperature jumps, in the case of the example of an embodiment of the pressure measuring sensor of the invention, constant coefficients a and b prove to be sufficient. Thus, the coefficients for dT/dt<0 are:

$a := a_-$ $b := b_-$

Depending on the given design details, also for negative temperature jumps, coefficients can be required, which have a dependence on the start temperature.

Figure 2:
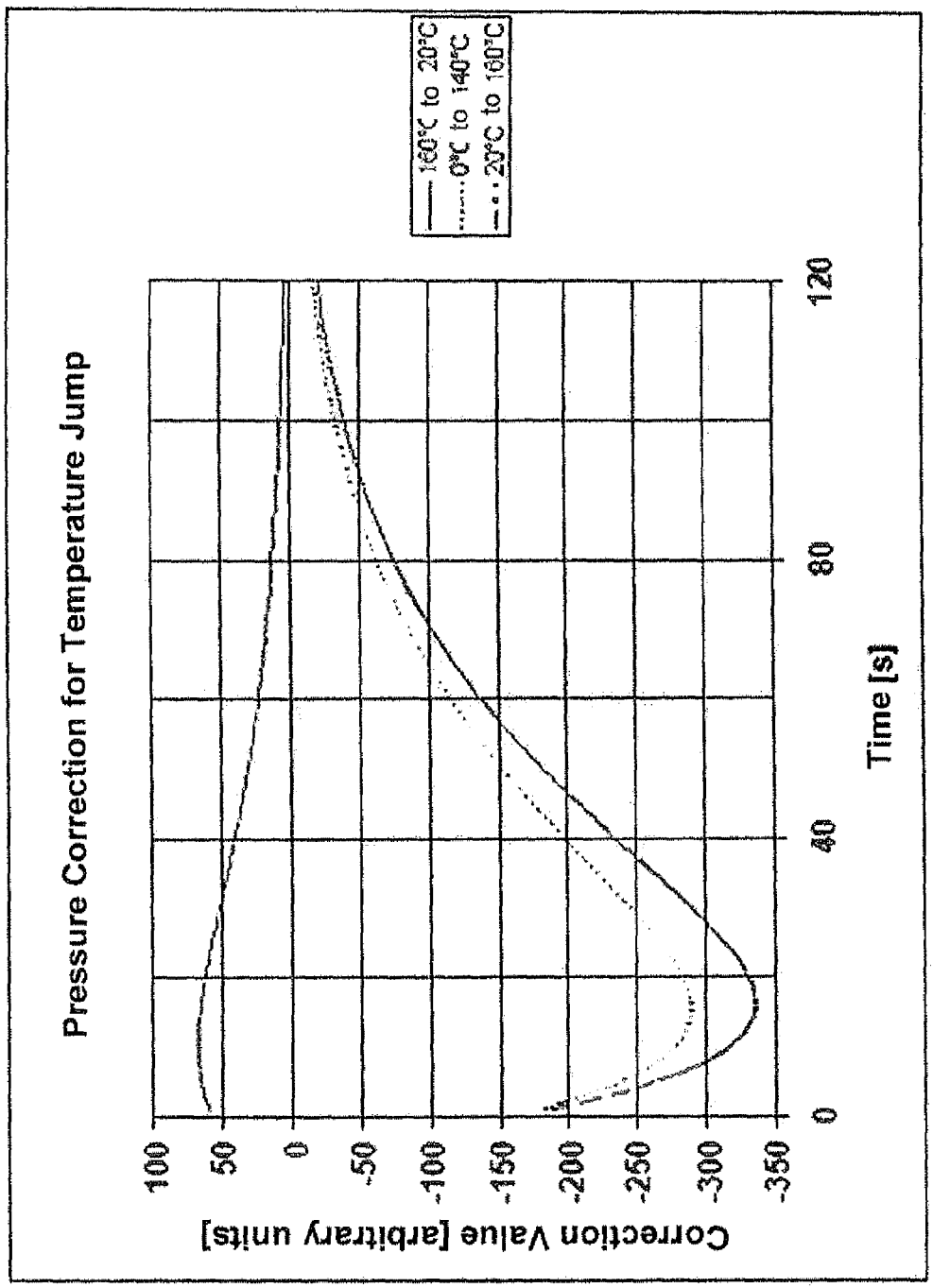
FIG. 2 is the time curve of an example of an embodiment of a pressure correction function for positive temperature jumps in the case of different starting temperatures as well as for negative temperature jumps.

The curves in FIG. 2 show the time curve of correction values, which from a start temperature of 0° C. and 20° C., in each case, are for compensating the pressure error in the case of a positive temperature jump of 140° C. In such case, the curve with a start temperature of 20° C. has a greater magnitude than the curve with a start temperature of 0° C.

For comparison between a positive temperature jump and a negative temperature jump, also shown is the correction function for a negative temperature jump of 140° C., wherein this correction function has no dependence on the starting temperature.

It is evident that the need for correction for negative temperature jumps is significantly smaller than for positive temperature jumps. Thus, for example, the value for a for positive temperature jumps in the case of the investigated sensors lies between 30 and 40, while b for positive temperature jumps as a function of the starting temperature has a value between −1 and −6 in the case of start temperatures between 20 degree Celsius and 80 degree Celsius. For negative temperature jumps, the value for a in the case of the investigated pressure measuring sensor lies between −5 and −20 and the value for b has a constant value between 0 and 1. As already earlier mentioned, these coefficients are to be determined type-specifically and are not directly transferrable from one sensor type to another.

In implementing the present invention, of course, the time derivative of the temperature can be determined other than as a differential quotient. Instead, based on stored temperature measured values, a difference quotient can be determined, which is used as an estimated value of the time derivative of the temperature. As soon as the magnitude of the current difference quotient acritically exceeds the threshold value, the pressure measurement values $p_s$ are corrected with the value $p_{corr}$, wherein the associated temperature value $T_0$ for calculating the correction value $p_{corr}$ is registered. The correction is applied until the magnitude of the difference quotient subceeds, or falls beneath, a threshold value, which defines the turn off criterion for the correction of temperature jumps. This limit value can likewise be $R_{krit}$.

Figure 3:
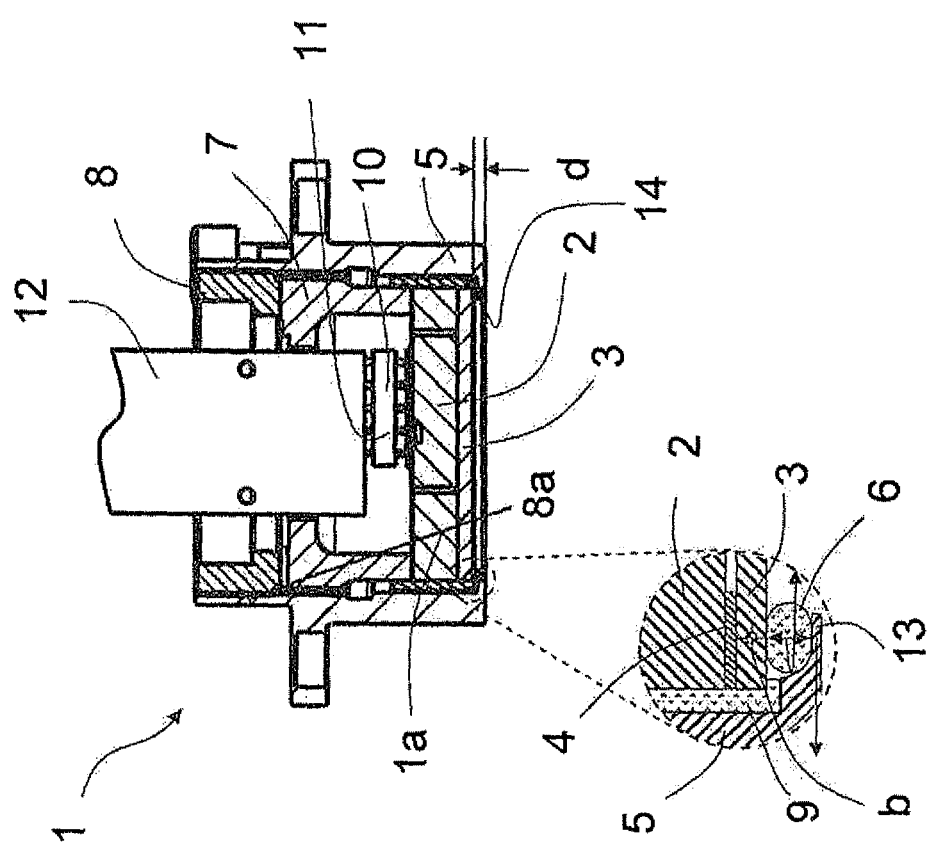
FIG. 3: is an example of an embodiment of a pressure measuring sensor of the invention.

The example of an embodiment of a pressure measuring sensor 1 of the invention shown in FIG. 3 includes a pressure measuring cell 1a, which has a ceramic platform 2 and a measuring membrane 3, which are joined by means of an active braze or hard solder 4. The pressure measuring cell 1a is arranged in a housing 5, wherein the housing has a housing opening 14, through which the measuring membrane 3 of the pressure measuring cell is contactable with a measured medium. Between the measuring membrane 3 and a radially inwards directed shoulder of the housing 5 bordering the housing opening, an O-ring-seal 6 is axially clamped. In order to hold the pressure measuring cell prestressed in the housing 5, first, a ceramic decoupling ring 7 presses on the rear side of the platform 2 of the pressure measuring cell, wherein the decoupling ring 7 by means of a metal ring 8 in position is held, wherein the metal ring 8 and the housing 5 each have a screw thread of a thread pair 8a complementary to one another, with which the axial position of the metal ring 8 can be fixed. Via the rigid axial coupling between the screw-in ring 8, the decoupling ring 7 and the pressure measuring cell, also the dimension d is defined, which defines the axial position of the measuring cell relative to the housing and, therewith, establishes the compressive pressure of the O-ring seal at the case given temperature. The pressure measuring cell is furthermore surrounded by an L-shaped sealing ring of an elastomer, which seals an annular gap between the lateral surface of the pressure measuring cell and the housing 5, in order to protect the interior of the housing against fouling and moisture, especially before the mounting of the O-ring 6 occurs. The L-ring 9 is not suitable for withstanding a media pressure under process conditions.

The pressure measuring cell comprises a capacitive transducer (not shown in detail), which includes mutually facing electrodes on the measuring membrane and the face of the platform, wherein the output signal of the capacitive transducer is fed to a preprocessing circuit 10, wherein the preprocessing circuit 10 includes a temperature sensor 11, whose measured value is referenced both for the compensating of static, as well as also dynamic, temperature influences. The pressure measuring sensor of the invention includes furthermore a signal processing circuit 12, which is arranged on a circuit board in the housing 5, wherein an input of the signal processing circuit 12 is connected to the preprocessing circuit 10 and receives from the latter a digitized temperature signal and a digitized raw pressure signal. The actual compensation of the dynamic and static temperature influences is performed by the signal processing circuit 12.

While the assignee desires not to be limited by a theory concerning the causes of the different time behaviors of the uncompensated pressure signal $p_s$ in the interpretation of the invention, nevertheless, the following explanations should serve to make plausible the different behavior as a function of time in the case of positive temperature jumps and negative temperature jumps.

Pressure measuring sensors or the connection of pressure measuring sensors to a measuring point can involve material pairings of materials of different coefficients of thermal expansion and lead to deviations from an ideal elastic behavior. Thus, for example, an elastomeric seal has a significantly greater coefficient of thermal expansion than metal or ceramic materials. When, thus, an elastomeric seal is clamped between two metal components or a metal component and a ceramic component, then, with increasing temperature, the clamping force between the components becomes larger. Shear forces are transmitted in such a system via friction, wherein the adapting to a temperature dependent equilibrium position can occur via relaxation in a stick-slip-mechanism. The curve of the pressure signal $p_s$ in the case of positive temperature jumps could occur based on such a mechanism. In the case of negative temperature jumps, a component, which has an elastomer, shrinks more strongly than metal or ceramic components, so that the coupling force between the components decreases, which enables a faster relaxation relative to friction forces. This is true the more so, when the elastomer has in the case of higher temperature partially suffered a plastic deformation, whereby the coupling strength in the case of declining temperature is still further reduced.

For illustration, reference is made to the detail in FIG. 3. For the following explanation, let the position mark b, which is drawn over the O-ring 6 in the measuring membrane 3, be considered as origin of a coordinate system. In the case of a temperature increase, the ceramic measuring membrane 3 and the ceramic platform 2 expand less strongly than the housing 5, which is metal. As a result, the radial shoulder 13, which surrounds the opening 14 of the housing 5 and which supports the O-ring 6 to the left from point b, moves. The O-ring 6 has a still greater coefficient of expansion, which leads to an axial strain and an increased compressive pressure. Additionally, the movement of the O-ring is limited by a radial shoulder 13. Therefore, the increasing volume of the O-ring will lead to a relative movement of the bearing area of the O-ring on the measuring membrane to the right relative to the position mark b. This leads, due to the frictional forces of O-ring 6 and the surface of the measuring membrane 3, to the introduction of bending moments into the measuring membrane, which can bring about the observed measurement error in the face of temperature jumps.

The invention claimed is:

1. A method for compensating temperature gradient influences on a pressure measuring transducer, comprising the steps of:
   registering a pressure signal $S_p(t)$;
   registering a temperature signal $T(t)$;
   ascertaining a pressure measured value $p_s(S_p(t), T(t))$;
   determining the time derivative of the temperature signal $dT/dt$; and
   correcting the pressure measured value with a correction function, which depends on the time derivative, wherein:
   as a function of the sign of the time derivative, another correction function is selected, or other coefficients in a function of equal type are selected.

2. Method as claimed in claim 1, wherein:
a correction function, $p_{corr}(T, T_0, dT/dt)$, which is applied in the case of one sign of dT/dt, has a greater effect on the pressure measurement value than a correction function, which is applied in the case of the other sign of dT/dt.

3. The method as claimed in claim 1, wherein:

$|P_{corr}(T,T_0,dT/dt)/(dT/dt)|$ for $dT/dt<0$ is smaller than $|P_{corr}(T,T_0,dT/dt)/(dT/dt)|$ for $dT/dt>0$.

4. The method as claimed in claim 1, wherein:
the correction function is proportional to the time derivative of the temperature dT/dt.

5. The method as claimed in claim 1, wherein:
the correction function is only applied when the magnitude of dT/dt exceeds a reference value $R_{krit}$.

6. The method as claimed in claim 1, wherein:
the correction function is proportional to a sum, which contains a constant and a product of a coefficient and the difference between the current temperature and a start temperature $T_0$ at the beginning the temperature jump.

7. The method as claimed in claim 5, wherein:
the start temperature $T_0$ is the temperature, which is measured, when in a correction cycle, for the first time: $|dT/dt|>R_{krit}$.

8. The method as claimed in claim 1, wherein:
the pressure measurement value output by the pressure measuring transducer is ascertained in a two-stage method, wherein, first, a pressure measurement value is obtained taking into consideration the primary signal and the temperature signal; and
the following compensation for dynamic temperature fluctuations occurs when the magnitude of the time derivative of the temperature dT/dt exceeds a reference value $R_{krit}$.

9. The pressure measuring sensor, comprising:
a housing with a housing opening;
a pressure measuring cell arranged in said housing;
a temperature sensor arranged in said housing; and wherein:
a processing circuit, in order to provide a pressure measurement value, which depends on the primary signal, the temperature signal and the time derivative of the temperature signal,
said pressure measuring cell is contactable with a media pressure through said housing opening;
said pressure measuring cell has a transducer, which outputs a pressure dependent, primary signal;
said temperature sensor is provided to register a temperature relevant for the behavior of the pressure measuring cell, and to output a temperature signal, which corresponds to such temperature; and
the extent of the influence of the time derivative on the pressure measurement value depends on the sign of the time derivative.

10. The pressure measuring sensor as claimed in claim 9 wherein:
said pressure measuring cell is directly contactable with the medium through said housing opening;
a sealing ring is axially clamped between a radially inwards directed shoulder, which surrounds said housing opening, and an end face of said pressure measuring cell.

11. The pressure measuring sensor as claimed in claim 10, wherein:
said sealing ring is radially supported by a section of a wall of said housing.

12. The pressure measuring sensor as claimed in claim 9, wherein:
said pressure measuring cell comprises a ceramic, having a measuring membrane of corundum and a platform of corundum.

13. The pressure measuring sensor as claimed in claim 9, wherein:
said housing comprises metal, especially steel.

14. The pressure measuring sensor as claimed in claim 9, wherein:
said temperature sensor referenced for compensating dynamic temperature influences is in thermal contact with the pressure measuring cell.

15. The pressure measuring sensor as claimed in claim 9, wherein:
said temperature sensor is arranged on a rear surface, or near the rear surface, of the platform of said pressure measuring cell.

* * * * *